US010169548B2

(12) United States Patent
Anders et al.

(10) Patent No.: US 10,169,548 B2
(45) Date of Patent: *Jan. 1, 2019

(54) IMAGE OBFUSCATION (71) Applicant: INTERNATIONAL BUSINESS MACHINES CORPORATION, Armonk, NY (US)

(72) Inventors: Kelley L. Anders, East New Market, MD (US); Paul R. Bastide, Boxford, MA (US); Stacy M. Cannon, Apex, NC (US); Trudy L. Hewitt, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 164 days.

This patent is subject to a terminal disclaimer.

(21) Appl. No.: 15/245,247

(22) Filed: Aug. 24, 2016

(65) Prior Publication Data
US 2018/0060542 A1 Mar. 1, 2018

(51) Int. Cl.
G06F 21/10 (2013.01)
G06F 21/62 (2013.01)
(Continued)

(52) U.S. Cl.
CPC .......... G06F 21/10 (2013.01); G06F 21/6245 (2013.01); G06K 9/00221 (2013.01);
(Continued)

(58) Field of Classification Search
CPC ... G06F 21/10; G06F 21/6245; G06T 7/0081; G06T 2207/20012; G06K 9/00221; H04N 5/262
(Continued)

(56) References Cited

U.S. PATENT DOCUMENTS 9,147,179 B2 9/2015 Syeda-Mahmood et al.
2010/0002070 A1 1/2010 Ahiska
(Continued)

FOREIGN PATENT DOCUMENTS

WO 2012047400 A1 4/2012
WO 2012047403 A1 4/2012
(Continued)

OTHER PUBLICATIONS

Poller et al., "Robust Image Obfuscation for Privacy Protection in Web 2.0 Applications", Proceedings of SPIE—The International Society for Optical Engineering, Jan. 2012, pp. 1-16.
(Continued)

Primary Examiner — Kambiz Zand
Assistant Examiner — Benjamin A Kaplan
(74) Attorney, Agent, or Firm — MIchael O'Keefe (57) ABSTRACT A method to obfuscate images is provided. The method may include a monitoring engine determining which images and regions of images need to be obfuscated. The method may also include an obfuscation engine determining the proper obfuscation processes in order to optimally obfuscate an image. The method may further include obfuscating the regions of the image based on the determined proper obfuscation processes. The method may also include marking the regions with an identifier representing the obfuscation process used. The method may also include using the identifiers in order to then de-obfuscate the image without a loss of image quality.

20 Claims, 5 Drawing Sheets (51) Int. Cl.
*G06K 9/00* (2006.01)
*H04N 5/262* (2006.01)
*G06T 7/00* (2017.01)

(52) U.S. Cl.
CPC ........... *G06T 7/0081* (2013.01); *H04N 5/262* (2013.01); *G06T 2207/20012* (2013.01)

(58) Field of Classification Search
USPC .......................................................... 726/30
See application file for complete search history.

(56) References Cited

U.S. PATENT DOCUMENTS

| | | |
|---|---|---|
| 2010/0002071 A1 | 1/2010 | Ahiska |
| 2011/0206285 A1 | 8/2011 | Hodge et al. |
| 2012/0079000 A1 | 3/2012 | Calcev et al. |
| 2012/0079059 A1 | 3/2012 | Fonseca, Jr. et al. |
| 2012/0079062 A1 | 3/2012 | Fonseca, Jr. et al. |
| 2013/0182007 A1* | 7/2013 | Syeda-Mahmood ........................ G06F 19/321 345/629 |
| 2015/0161773 A1 | 6/2015 | Takahashi et al. |
| 2015/0163206 A1* | 6/2015 | McCarthy ........... G06F 21/6227 713/171 |
| 2015/0278535 A1* | 10/2015 | Holman ............. G06F 21/6209 726/30 |
| 2015/0302600 A1 | 10/2015 | Kreder, III |
| 2016/0019415 A1 | 1/2016 | Ra et al. |
| 2016/0080155 A1 | 3/2016 | Arat et al. |
| 2016/0294781 A1 | 10/2016 | Ninan et al. |

FOREIGN PATENT DOCUMENTS

| | | |
|---|---|---|
| WO | 2012074659 A1 | 6/2012 |
| WO | 2016147066 A1 | 9/2016 |

OTHER PUBLICATIONS

Mell et al., "The NIST Definition of Cloud Computing", Recommendations of the National Institute of Standards and Technology, Special Publication 800-145, Sep. 2011, 7 pages.

IBM: List of IBM Patents or Patent Applications Treated as Related (Appendix P), Aug. 16, 2017, pp. 1-2.

Pending U.S. Appl. No. 15/668,739, filed Aug. 4, 2017, entitled: "Image Obfuscation", pp. 1-24.

* cited by examiner

IMAGE OBFUSCATION

BACKGROUND OF THE INVENTION

The present invention relates generally to the field of digital imaging, and more particularly to image obfuscation.

Privacy is becoming increasingly more important as new technological advances continue to enter the consumer marketplace. With the advent of social media, images are being shared constantly, thus further increasing the need for privacy. It is commonplace for a photograph of a user to be uploaded to a social media website without the user being aware that their photo was added to the site. This may result in an undesirable photo of the user being made available to a wide audience including acquaintances and non-acquaintances alike, thus compromising a user's privacy. A user may be aware of their image being uploaded, but may want to prevent certain users from being able to see them in the image in order to further protect privacy. While a variety of image obfuscation processes currently exist to protect a user's privacy, these techniques usually come with a tradeoff between the quality of the obfuscation and the quality of the image after removing the obfuscation.

SUMMARY

According to one embodiment, a method to obfuscate and de-obfuscate images is provided. The method may include identifying one or more regions of an image for obfuscation. The method may also include analyzing the image to determine one or more optimal obfuscation processes to obfuscate the identified region or regions. The method may further include obfuscating the identified regions based on the determined optimal obfuscation process. The method may also include marking the regions with one or more identifiers that represent the obfuscation process.

According to one embodiment, a computer system to obfuscate and de-obfuscate images is provided. The computer system may include identifying one or more regions of an image for obfuscation. The computer system may also include analyzing the image to determine one or more optimal obfuscation processes to obfuscate the identified region or regions. The computer system may further include obfuscating the identified regions based on the determined optimal obfuscation process. The computer system may also include marking the regions with one or more identifiers that represent the obfuscation process.

According to one embodiment, a computer program product to obfuscate and de-obfuscate images is provided. The computer program product may include identifying one or more regions of an image for obfuscation. The computer program product may also include analyzing the image to determine one or more optimal obfuscation processes to obfuscate the identified region or regions. The computer program product may further include obfuscating the identified regions based on the determined optimal obfuscation process. The computer program product may also include marking the regions with one or more identifiers that represent the obfuscation process.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art.

Embodiments of the present invention relate generally to the field of digital imaging, and more particularly to obfuscating images. The following described exemplary embodiments provide a system, method and program product for dynamically analyzing an image and determining optimal methods to properly obfuscate one or more regions of the image, based on the dynamically analyzed image.

As previously described multiple image obfuscation processes currently exist. However, these obfuscation processes do not take into account how to optimize the obfuscation processes used. For example, if there are multiple faces in a single photograph, the same obfuscation process for each face may not result in the best overall image obfuscation. If two of the faces have a bright contrast and a third is blurry with a dark contrast, applying the same obfuscation process to each face is not optimal. Furthermore, applying the same de-obfuscation process to the faces is also not optimal. Instead, an obfuscation engine will analyze the image and determine the appropriate obfuscation process to apply to each face. In addition, leaving a bread-crumb trail denoting the obfuscation processes used allows the de-obfuscation processes to take place more effectively. As a result, the obfuscation and de-obfuscation process has minimal impact on overall image quality.

According to at least one embodiment of the present invention, images are obfuscated based on constraints entered by a user. In one embodiment, a monitoring engine will determine which images of a user on a social media page need to be obfuscated based on constraints. Then, according to one implementation, if the monitoring engine determines that an image needs to be obfuscated, it sends the image to an obfuscation engine. Moreover, according to one implementation, the obfuscation engine then analyzes the image to determine which obfuscation processes to use for the various regions of the image that need to be obfuscated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++, or scripting languages, such as, perl, JavaScript json or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for dynamically analyzing an image and determining the optimal methods to properly obfuscate one or more regions of the image based on the dynamic analysis.

According to at least one implementation, a user can enter constraints for the monitoring engine to use in determining which images to send to the obfuscation engine. The constraints can be social media based use profiles of the user.

For example, a user may want the monitoring engine to send all pictures where the user is drinking a soft drink to the obfuscation engine. Based on the constraints from the monitoring engine, the obfuscation engine will blur out all of the soft drinks so as to hide the brand of the soft drink. As such, advantages of the present embodiment may include allowing users to set specific conditions for certain images to be obfuscated.

Embodiments of the present invention may not only obfuscate images and leave a bread-crumb trail to de-obfuscate the images, but may also prevent certain other users from having access to the bread-crumb trail to de-obfuscate the images. Embodiments of the present invention may also allow a social media user to specify which other users have access to the bread-crumb trail to de-obfuscate the images.

Figure 1:
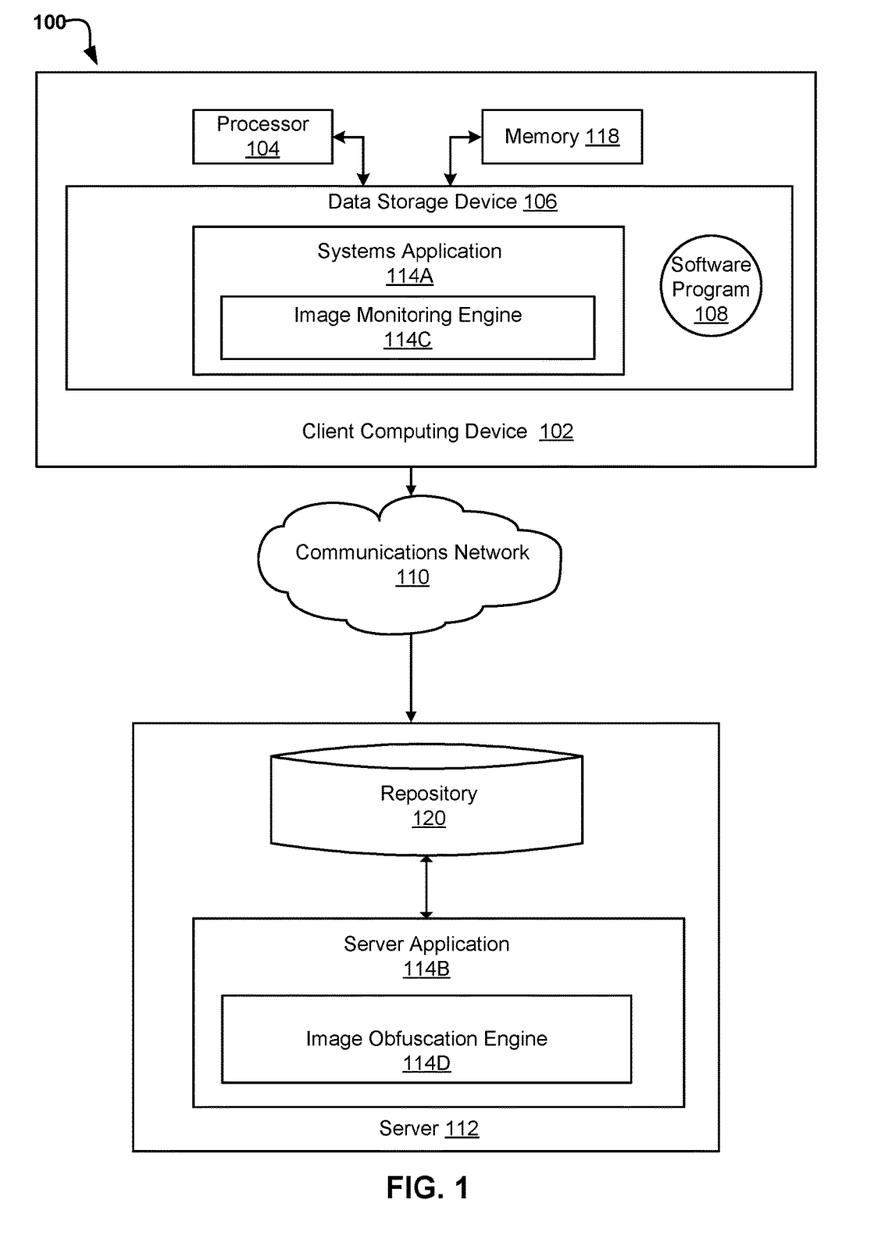
FIG. 1 illustrates a networked computer environment according to at least one embodiment.

Referring now to FIG. 1, an exemplary networked computer environment 100 in accordance with one embodiment is depicted. The networked computer environment 100 may include a client computing device 102 with a processor 104, memory 118, and a data storage device 106 that is enabled to run or execute program instructions of a software program 108. The client computing device 102 may include a systems application 114A which may include an image monitoring engine 114C. Image monitoring engine 114C transmits images based on user constraints to image obfuscation engine 114D. The networked computer environment 100 may also include a server 112 that is enabled to run a server application 114B, and interconnected with client computing device 102, over communications network 110, for providing a framework for obfuscating images, based on the client preferences of the client computing device 102. The server application 114B may also include image obfuscation engine 114D which dynamically analyzes and obfuscates images sent to it from the image monitoring engine 114C.

In the depicted embodiment, a client may use client computing device 102 to engage in image obfuscation. Images stored in memory 118 may be passed to systems application 114A so that image monitoring engine 114C can determine whether or not the image may need to be sent to image obfuscation engine 114D. A user may use software program 118 to set monitoring constraints for image monitoring engine 114C. For example, if the user wants their face to be obfuscated in all images sent to image monitoring engine 114C, the user can set that constraint using software program 108. For example, if image monitoring engine 114C determines that an image needs to be obfuscated, it may use communications network 110 to send the image to server 112. Server 112 may send the image to server application 114B so that image obfuscation engine 114D may obfuscate the image if required. After obfuscation is completed, the image may be saved in repository 120. Additionally, the obfuscated engine may be sent via communications network 110 to client computing device 102.

The networked computer environment 100 may include a plurality of computing devices 102 and servers 112, only one of which is shown for illustrative brevity. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computing device 102 may communicate with server computer 112 via the communications network 110. The communications network 110 may include connections, such as wire, wireless communication links, or fiber optic cables.

The data storage device 106 of the client computing device 102 is any type of storage device, storage server, storage area network, redundant array of independent discs (RAID), cloud storage service, or any type of data storage. The data storage device 106 may also be a relational model database server for storing program instructions for monitoring images and transmitting select images, based on client preferences of the client computing device 102.

Server 112 may be, for example, a server computer system such as a management server, a web server, or any other electronic device or computing system capable of receiving and sending data, based on client preferences of the client computing device 102. The server 112 may also represent a "cloud" of computers interconnected by one or more networks, whereby the server 112 may be a primary server for a computing system utilizing clustered computers when accessed through client computing device 102. The repository 120 is any type of storage device, storage server, storage area network, redundant array of independent discs (RAID), cloud storage service, or any type of data storage for storing information relating to image obfuscation, or configurations of server 112.

Software program 108 may provide platform for executing program instructions of systems application 114A.

Figure 2:
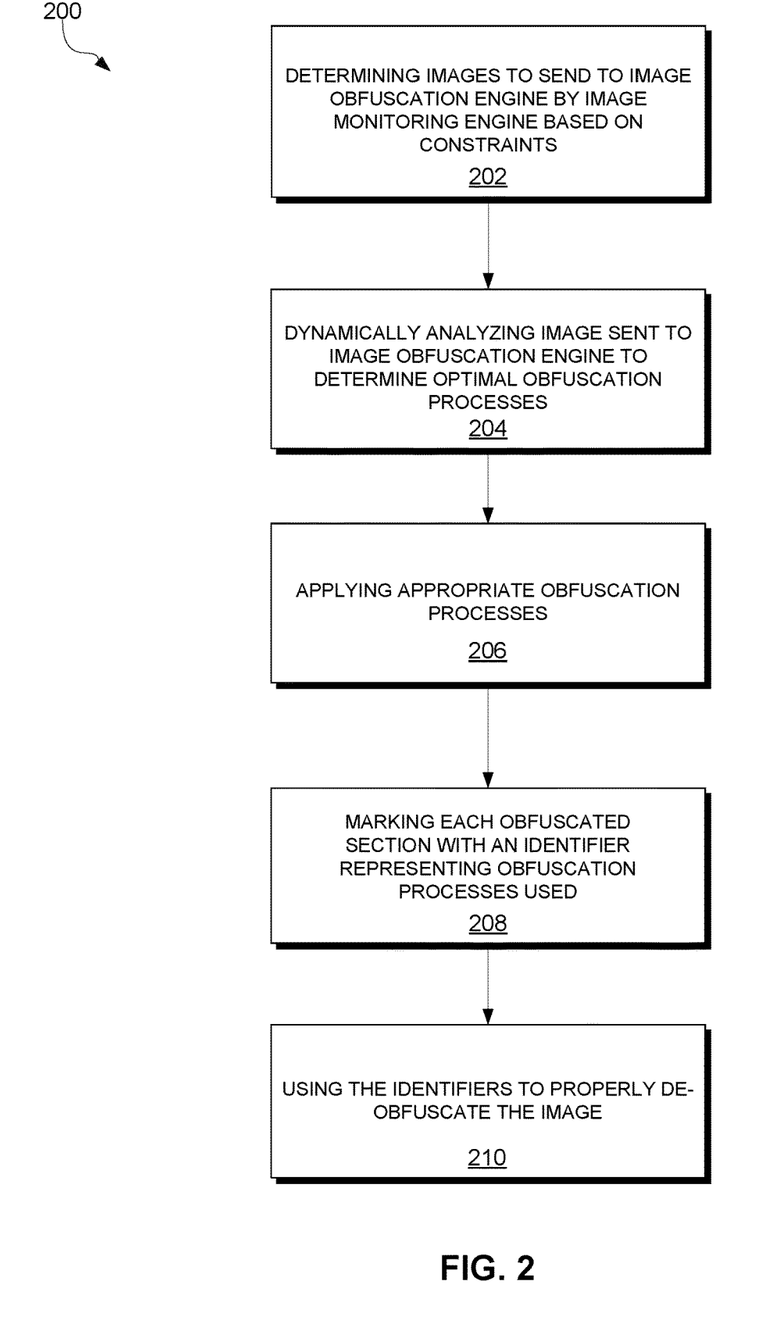
FIG. 2 is an operational flowchart illustrating the steps carried out by a program for image obfuscation according to at least one embodiment.

FIG. 2 is an operational flowchart diagram depicting operational steps of a method for image obfuscation, in accordance with an embodiment of the present disclosure. In one embodiment, image monitoring engine 114C sends images to image obfuscation engine 114D in accordance with constraints set buy a user. Furthermore, image obfuscation engine 114D then obfuscates the required regions of the image sent to it by image monitoring engine 114C. Steps of method 200 may be implemented using one or more modules of a computer program, for example, image obfuscation, and executed by a processor of a computer, such as server 112. It should be appreciated that FIG. 2 does not imply any limitations with regard to the environments or embodiments which may be implemented. Many modifications to the depicted environment or embodiment shown in FIG. 2 may be made.

With respect to FIG. 2, at 202, image monitoring engine 114C may determine which images to send to image obfuscation engine 114D based on constraints. A user may define constraints for image monitoring engine 114C to use in determining which images to send to image obfuscation engine 114D. In one embodiment, there may be a constraint to only send images to image obfuscation engine 114D that contain the user drinking a soft drink. In that embodiment, image monitoring engine 114C will send all images of the user drinking a soft drink to image obfuscation engine 114D.

A user provides four photos to image monitoring engine 114C. The user provides constraints to image monitoring engine 114C to obfuscate all faces and the user's entire body. The photos that fall within the constraints will be sent by image monitoring engine 114C to image obfuscation engine 114D.

At 204, image obfuscation engine 114D may dynamically analyze the images sent to it from image monitoring engine 114C to determine the optimal obfuscation processes to use. For example, an image may have multiple regions that need to be obfuscated, such as a face that is out of focus and a face that is extremely bright. Image obfuscation engine 114D determines which obfuscation process to use for each part of the image to be obfuscated.

Image obfuscation engine 114D analyzes a photo and determines that there are three regions that need to be obfuscated. Image obfuscation engine 114D determines the optimal obfuscation process to apply to each region based on the context of each region. For example, a bright region will be obfuscated using a different method than an out-of-focus region.

At 206, image obfuscation engine 114D may apply the determined obfuscation processes to the appropriate regions of the image. A different obfuscation process may be used for each region of the image that needs to be obfuscated. Image obfuscation engine 114D applies the determined optimal obfuscation processes to each of the three regions that were determined to be obfuscated.

At 208, image obfuscation engine 114D may mark the image with an identifier representing the obfuscation method used on each region. These identifiers allow for optimal de-obfuscation when required. The identifier will be placed on the image itself, representing the obfuscation method used. The obfuscation process used may be denoted in the image metadata. The obfuscation process would be determinable only by accessing the image metadata. For example, not only does image obfuscation engine 114D add metadata as to which method is used in the obfuscation process, but a location identifier of a portion/region within the image so as to create a breadcrumb key for re-constructing the image.

After the three regions of the image are obfuscated, image obfuscation engine 114D writes to the image metadata detailing the regions of the image that were obfuscated, and what obfuscation processes were used.

At 210, image obfuscation engine 114D may use the identifiers to properly de-obfuscate the image. Image obfuscation engine 114D can "unlock" the image to return to its normal pre-obfuscation form by using the markers to use the appropriate de-obfuscation process on each obfuscated region. The image obfuscation engine 114D determines the obfuscation processes used on the regions by reading the identifiers in the image metadata. Image obfuscation engine 114D then de-obfuscates the image based on the identifiers in the metadata.

Image obfuscation engine 114D accesses the image metadata and determines the obfuscation methods used for each region in the image. Based on the obfuscation methods determined from the identifiers in the metadata, image obfuscation engine 114D then de-obfuscates the image. According to embodiments, image obfuscation engine 114D not only determines method for obfuscation and adding an identifier, but, the identifier also act as a breadcrumb trial in knowing where each of the regions reside in picture of the image so that the obfuscation engine knows how to reassemble the de-obfuscated regions back together.

Figure 3:
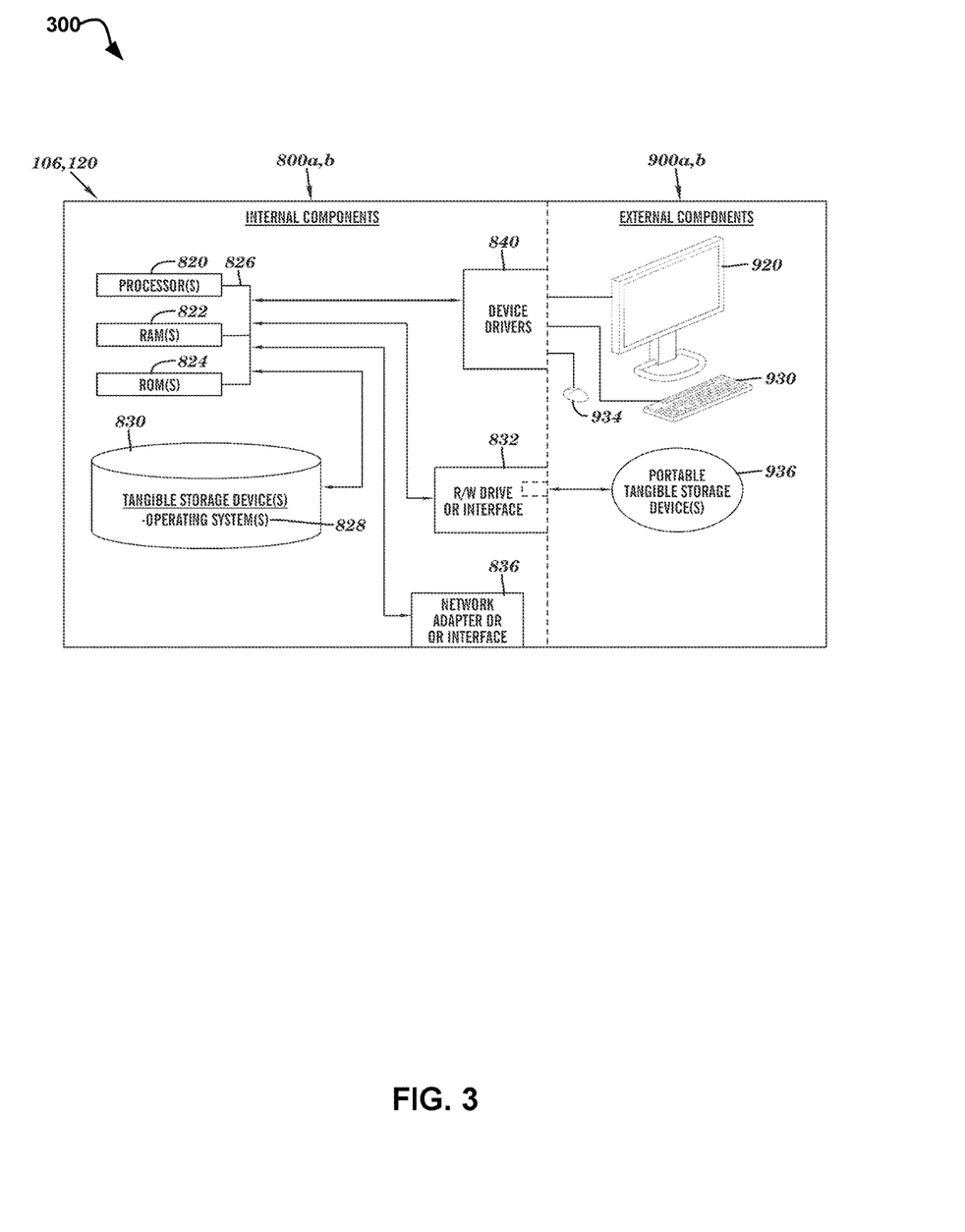
FIG. 3 is a block diagram of internal and external components of computers and servers depicted in FIG. 1 according to at least one embodiment.

FIG. 3 is a block diagram 300 depicting internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Client computing device 102 (FIG. 1), and server 112 (FIG. 1) include respective sets of internal components 800 a, b and external components 900 a, b illustrated in FIG. 3. Each of the sets of internal components 800 a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and data storage device (FIG. 1) in client computing device 102 and server application 114B in network server 112 are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. Software program 108 can be stored on one or more of the respective portable computer-readable tangible storage devices 936, read via the respective R/W drive or interface 832 and loaded into the respective hard drive 830.

Each set of internal components 800 a, b also includes network adapters or interfaces 836 such as a TCP/IP adapter cards, wireless Wi-Fi interface cards, or 3G or 4G wireless interface cards or other wired or wireless communication links. System application 114A in client computing device 102 and server application 114B in server 112 can be downloaded to client computing device 102 from an external computer via a network (for example, the Internet, a local area network or other, wide area network) and respective network adapters or interfaces 836. From the network adapters or interfaces 836, the procedure extraction and enrichment program 108A in client computing device 102 and the procedure extraction and enrichment program 108B in network server computer 112 are loaded into the respective hard drive 830. The network may comprise copper wires, optical fibers, wireless transmission, routers, firewalls, switches, gateway computers and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
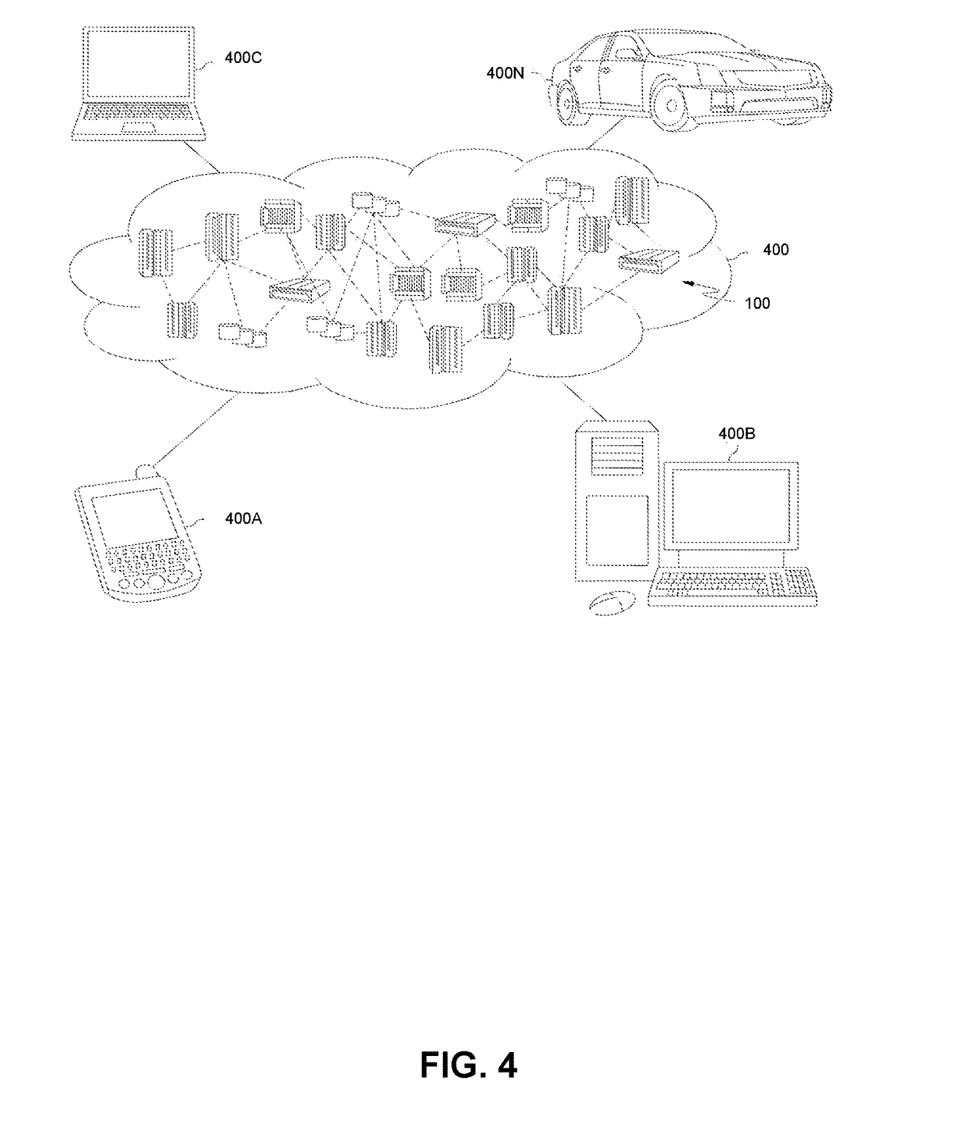
FIG. 4 illustrates a cloud computing environment according to at least one embodiment.

Referring now to FIG. 4, illustrative cloud computing environment 400 is depicted. As shown, cloud computing environment 400 comprises one or more cloud networked computer environment 100 with which local computing devices used by cloud consumers, such as, for example, personal digital assistant (PDA) or cellular telephone 400A, desktop computer 400B, laptop computer 400C, and/or automobile computer system 400N may communicate. Networked computer environment 100 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 400A-N shown in FIG. 4 are intended to be illustrative only and that networked computer environment 100 and cloud computing environment 400 can communicate with any type of computerized device over any type of network and/or network addressable connection (e.g., using a web browser).

Figure 5:
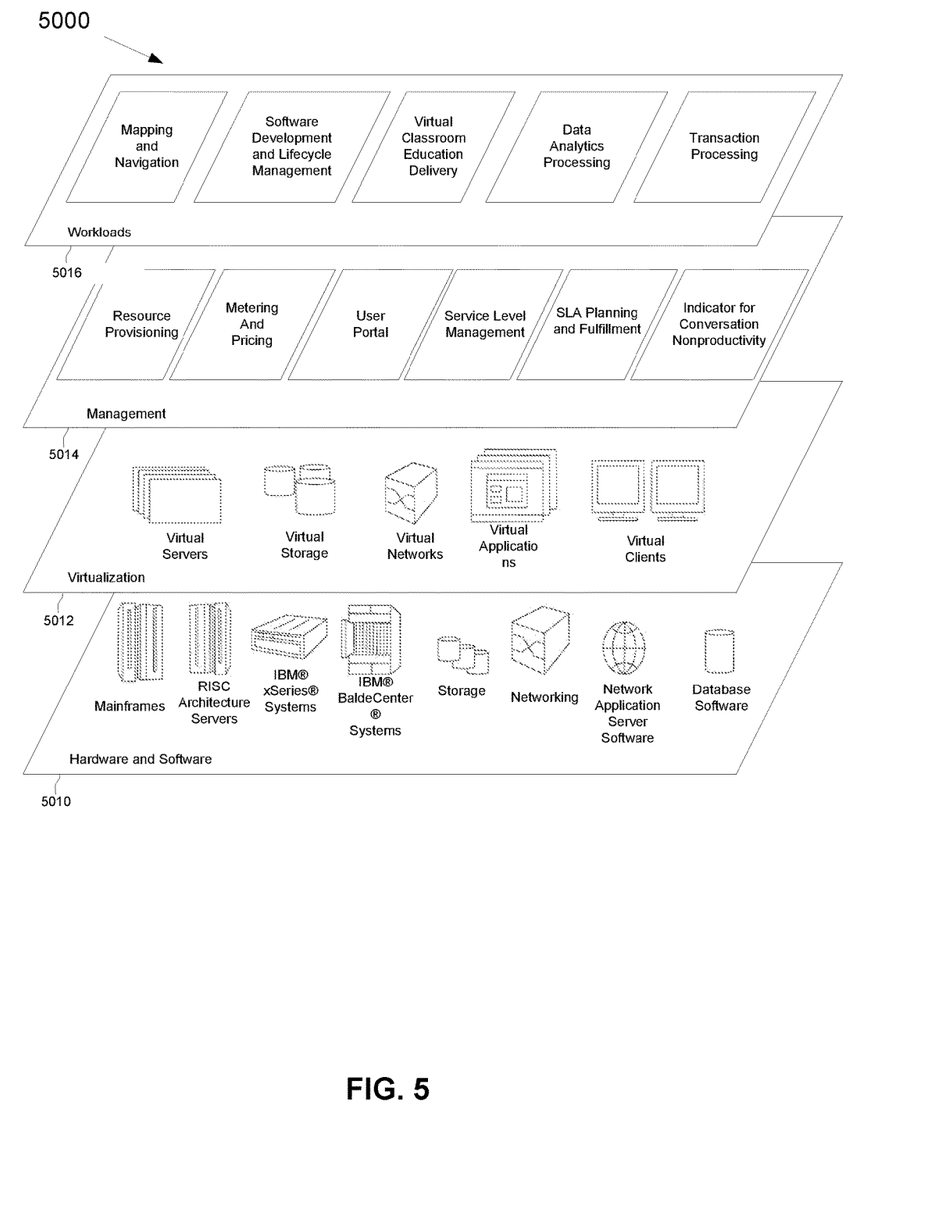
FIG. 5 illustrates a set of functional abstraction layers as depicted in FIG. 4 according to at least one embodiment.

Referring now to FIG. 5, a set of functional abstraction layers 5000 provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 5010 includes hardware and software components. Examples of hardware components include: mainframes; RISC (Reduced Instruction Set Computer) architecture based servers; storage devices; networks and networking components. In some embodiments, software components include network application server software.

Virtualization layer 5012 provides an abstraction layer from which the following examples of virtual entities may be provided: virtual servers; virtual storage; virtual networks, including virtual private networks; virtual applications and operating systems; and virtual clients.

In one example, management layer 5014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. An Indicator for Conversation Nonproductivity may measure the productivity of a conversation between multiple users of a mobile computing device.

Workloads layer 5016 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A method for managing image obfuscation comprising:
    receiving, by the computer, an image file uploaded to a social networking site;
    identifying at least two portions of the image file that match at least one criteria of a plurality of obfuscation methods;
    dividing the image file into a plurality of regions based on the at least two portions; and
    executing, simultaneously, each obfuscation method to a corresponding region of the plurality of regions based on the corresponding region matching the at least one criteria of the plurality of obfuscation methods.

2. The method of claim 1, wherein, a user or a computer identifies the plurality of regions of the image for obfuscation.

3. The method of claim 1, wherein, the plurality of obfuscation methods is based on image hues, image resolution or image object recognition.

4. The method of claim 1, further comprising:
    a monitoring engine periodically parsing one or more images from a web server and determining which of the one or more images should be obfuscated and transmitting the one or more images that should be obfuscated to an obfuscation engine.

5. The method of claim 4, wherein, a user places one or more constraints on the monitoring engine that govern what is transmitted to the obfuscation engine.

6. The method of claim 1, further comprising:
    tagging each region with an identifier, wherein the identifier comprises the executed obfuscation method for the corresponding region; and
    storing each identifier in a plurality of metadata associated with the image, wherein the identifier is used to rebuild the image during a de-obfuscation method.

7. The method of claim 6, further comprises:
    executing the de-obfuscation method based on the identifier associated with each region serving as a breadcrumb trail.

8. A computer system for managing image obfuscation, the system comprising:
    one or more processors, one or more computer-readable memories, one or more computer-readable tangible storage devices and program instructions which are stored on at least one of the one or more storage devices for execution by at least one of the one or more processors via at least one of the one or more memories, the program instructions comprising:
    receiving, by the computer, an image file uploaded to a social networking site;
    identifying at least two portions of the image file that match at least one criteria of a plurality of obfuscation methods;
    dividing the image file into a plurality of regions based on the at least two portions; and
    executing, simultaneously, each obfuscation method to a corresponding region of the plurality of regions based on the corresponding region matching the at least one criteria of the plurality of obfuscation methods.

9. The computer system of claim 8, wherein, a user or a computer identifies the plurality of regions of the image for obfuscation.

10. The computer system of claim 8, wherein, the plurality of obfuscation methods is based on image hues, image resolution or image object recognition.

11. The computer system of claim 8, further comprising:
    a monitoring engine periodically parsing one or more images from a web server and determining which of the one or more images should be obfuscated and transmitting the one or more images that should be obfuscated to an obfuscation engine.

12. The computer system of claim 11, wherein, a user places one or more constraints on the monitoring engine that govern what is transmitted to the obfuscation engine.

13. The computer system of claim 8, further comprising:
tagging each region with an identifier, wherein the identifier comprises the executed obfuscation method for the corresponding region; and
storing each identifier in a plurality of metadata associated with the image, wherein the identifier is used to rebuild the image during a de-obfuscation method.

14. The computer system of claim 13, further comprising:
executing the de-obfuscation method based on the identifier associated with each region serving as a breadcrumb trail.

15. A computer program product for managing image obfuscation, the computer program product comprising:
one or more processors, one or more computer-readable memories, one or more computer-readable tangible storage devices and program instructions which are stored on at least one of the one or more storage devices for execution by at least one of the one or more processors via at least one of the one or more memories, the program instructions comprising:
receiving, by the computer, an image file uploaded to a social networking site;
identifying at least two portions of the image file that match at least one criteria of a plurality of obfuscation methods;
dividing the image file into a plurality of regions based on the at least two portions; and
executing, simultaneous, each obfuscation method to a corresponding region of the plurality of regions based on the corresponding region matching the at least one criteria of the plurality of obfuscation methods.

16. The computer program product of claim 15, wherein, a user or a computer identifies the plurality of regions of the image for obfuscation.

17. The computer program product of claim 15, wherein, the plurality of obfuscation methods is based on image hues, image resolution or image object recognition.

18. The computer program product of claim 15, further comprising:
a monitoring engine periodically parsing one or more images from a web server and determining which of the one or more images should be obfuscated and transmitting the one or more images that should be obfuscated to an obfuscation engine.

19. The computer program product of claim 15, further comprising:
tagging each region with an identifier, wherein the identifier comprises the executed obfuscation method for the corresponding region; and
storing each identifier in a plurality of metadata associated with the image, wherein the identifier is used to rebuild the image during a de-obfuscation method.

20. The computer program product of claim 19, further comprising:
executing the de-obfuscation method based on the identifier associated with each region serving as a breadcrumb trail.

* * * * *